June 1, 1965  H. J. MODREY  3,186,055
SHACKLE COUPLING

Filed May 8, 1963  2 Sheets-Sheet 1

INVENTOR.
HENRY J. MODREY
BY
ATTORNEYS

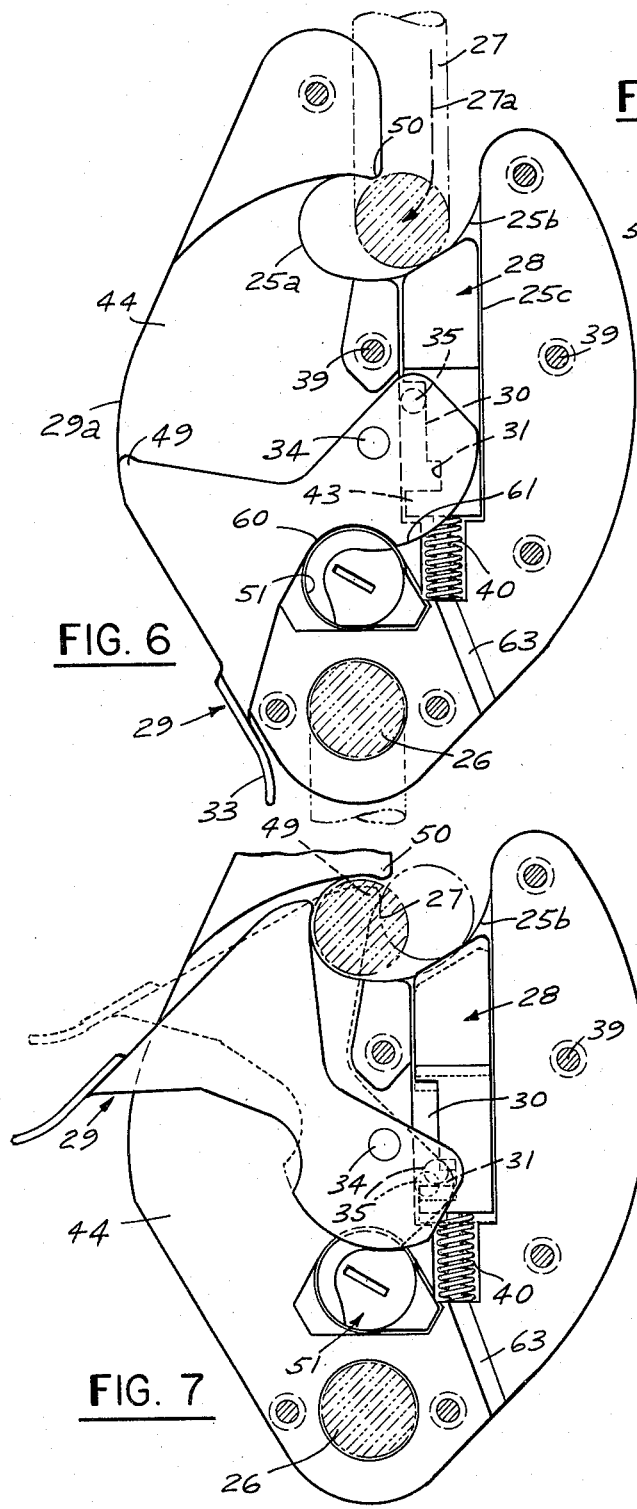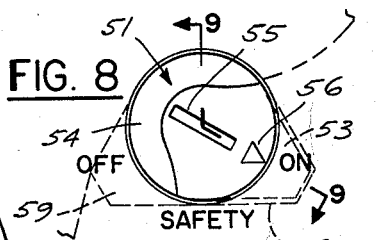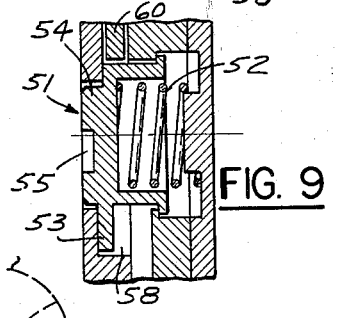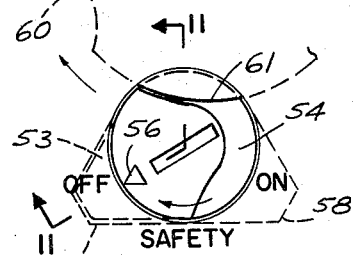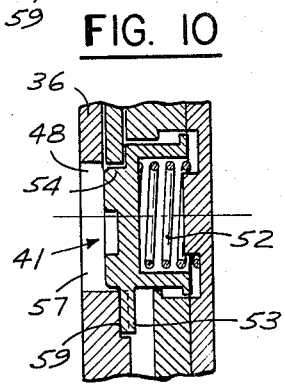
INVENTOR.
HENRY J. MODREY
BY
ATTORNEYS

United States Patent Office 3,186,055
Patented June 1, 1965

3,186,055
SHACKLE COUPLING
Henry J. Modrey, Stamford, Conn., assignor to Norco, Inc., Georgetown, Conn., a corporation of Connecticut
Filed May 8, 1963, Ser. No. 278,945
8 Claims. (Cl. 24—241)

The present invention relates to couplings, and more particularly to couplings for releasably locking a member to be coupled to a coupling structure attached or attachable to a support member.

It is an object of the invention to provide a novel and improved coupling of the general kind above-referred to, to which a member may be coupled and automatically locked by inserting such member into the receiver of the coupling.

Another object of the invention is to provide a novel and improved coupling of the general kind above-referred to from which a member coupled and locked thereto can be released by simply displacing a release or trip member of the coupling.

Still another object of the invention is to provide a novel and improved coupling of the general kind above-referred to which does not require assembly or disassembly of any parts, tightening or loosening of any parts, or the use of tools to effect coupling and locking of a member to be coupled or release of a coupled and locked member.

A further object of the invention is to provide a novel and improved coupling in which a pull load applied to the coupled member is sustained by the body of the coupling which body can be readily given any desired and required strength, rather than by a locking member of the coupling.

A still further object of the invention, allied with the next preceding one, is to provide a novel and improved coupling which permits release of the coupled member under load since the load does not exert pressure upon the locking member of the coupling.

A more specific object of the invention is to provide a novel and improved coupling in which a locking assembly constituting part of the coupling may be set either in a position freeing the release or trip member of the coupling for actuation thereof or in a position locking the release or trip member to prevent accidental actuation of the same, the locking assembly in said latter position permitting actuation of the release or trip member by intentional and specific manipulation of the locking assembly.

Another more specific object of the invention is to provide a coupling including ejecting means for ejecting the coupled member from the coupling in a convenient and rapid manner by operating the ejecting means.

Couplings according to the invention may be advantageously used for coupling shackles, hoist ropes, pull ropes, eye bolts, rods, etc. They may be also advantageously used for releasably locking together the ends of ropes, straps, belts, etc., such as safety or seat belts.

Other and further objects, features and advantages of the invention will be pointed out hereinafter and set forth in the appended claims constituting part of the application.

In the accompanying drawing, several preferred embodiments of the invention are shown by way of illustration and not by way of limitation.

In the drawing:

FIG. 6 is a front elevational view similar to FIG. 3, the cover plate being removed and showing a shackle being inserted in the coupling.

FIG. 7 is a front elevational view, the cover plate being removed and showing the ejection of a shackle from the coupling.

FIG. 8 is a front elevational view showing the locking assembly of the coupling in detail.

FIG. 9 is a section taken on line 9—9 of FIG. 8.

FIG. 10 is a view similar to FIG. 8, but showing the locking assembly in a different operational position and FIG. 11 is a section taken on line 11—11 of FIG. 10.

Figure 3:
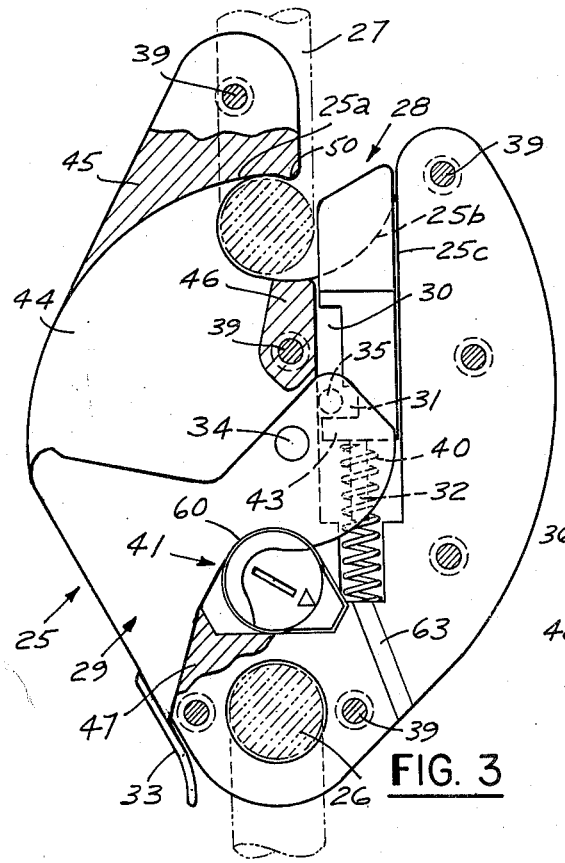
FIG. 3 is a front elevation of the coupling in an enlarged scale, the cover plate of the coupling being removed and a shackle being shown locked in the coupling.
Figure 4:
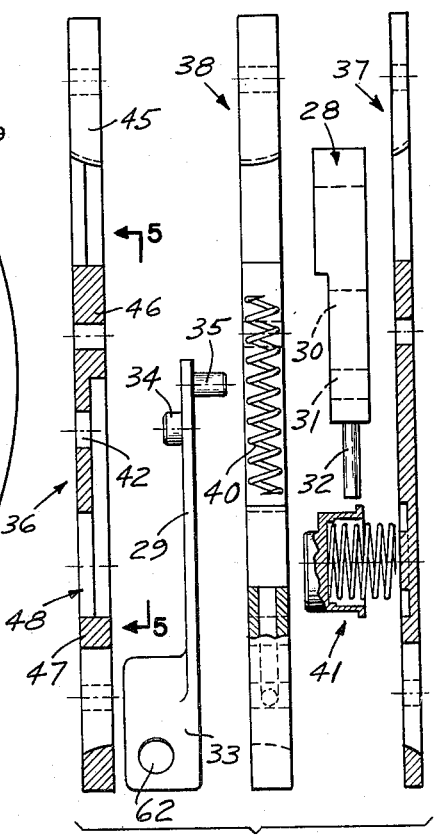
FIG. 4 is an exploded side view of FIG. 3, partly in section.

Referring first to FIGS. 1 through 11 in detail, the coupling exemplified in these figures is shown as coupling a shackle, but is, of course, suitable for coupling any other element that may be received by the coupling in the manner more fully described hereinafter.

The coupling comprises a body member 25 to which is secured, by any suitable means, a shackle 26 and to which a shackle 27 is to be releasably coupled. The body member comprises outer plates 36 and 37 between which is sandwiched a center plate 38. All three plates are held in assembly by rivets 39. The three plates have cut-outs to form a hook portion 25a for receiving and retaining shackle 27 or other member to be coupled, a guideway 25b for guiding shackle 27 into and out of the hook portion and a slideway 25c in which a slide 28 is slidably guided for movement between the operational position shown in FIGS. 6 and 7. As it is evident, the slide in the position of FIGS. 1 or 3 blocks guideway 25b thus locking a shackle received in the hook portion in the same and in the position of FIGS. 6 or 7 clears the guideway, thus permitting insertion of a shackle into the hook portion or withdrawal therefrom. Displacement of the slide from its shackle-locking position into its shackle-releasing position and vice versa is effected by means of an actuating lever 29 which is pivotal within a slot 44 formed by coupling plates 36, 37 and 38, as will be more fully described hereinafter.

Slide 28 is formed with a lengthwise recess 30 which is continued at its inner end by a transverse recess 31 defining a shoulder 43. A spring 40 inserted between the lower end of slide 28 and the bottom of slideway 25c, which is preferably set off to guide the spring, biases the slide into the locking position of FIG. 3. The spring is further guided by an extension 32 of the slide.

Lever 29 is a two-arm lever pivotal about a trunnion pin 34 engaging a bore 42 formed in plate 36. The short arm of the lever mounts an operating pin 35 guided in recesses 30 and 31 of the slide. The long arm of the lever is accessible at the outside of the body member and has preferably a finger-grasp projection 33 to facilitate pivoting of the lever. In order to define more clearly the space 44 within which lever 29 moves, portions of plate 36 are hatched at 45, 46 and 47 in FIG. 3. As it is also clearly shown in this figure, the shackle-bearing hook portion of the body member and the internal plate walls along which the actuating lever is moving when being pivoted are appropriately curved. Area 47 continues full width around the bottom edge of a hole 48 in plate 36 to accommodate a locking assembly 41 (to be described more fully hereinafter) and is continued to the top end of the righthand portion of the coupling, as shown in FIG. 3. In other words, the locations of rivets 39 are indicative of all the full width areas of plate 36. A bore 63 leading outwardly from the lower end of slideway 25c serves to discharge entrapped water or dirt which may accumulate in the slideway and interfere with the operation of the coupling.

Referring now to FIG. 6, this figure illustrates the insertion of a shackle 27 into the mouth of hook portion 25a. As it is evident from the previous description, slide 28 is urged by spring 40 into its upper or locking position of FIG. 3. However, the slide can be depressed against the action of spring 40, movement of recess 30 along pin 35 permitting such depression of the slide. To effect insertion and locking of shackle 27 in the coupling, the shackle is forcibly guided along the smoothly curved guideway 25b in the manner indicated by the arrow 27a of FIG. 6. As the shackle moves along the face of slide 28, the slide is depressed and when the shackle is lodged fully in the hook portion, that is beyond the nose 50, the slide is snapped back into its locking position by spring 40. The aforedescribed components of the coupling now occupy the positions shown in FIGS. 1 and 3 in which shackle 27 is locked to the coupling. Accordingly, the pivotal position of lever 29 shown in FIGS. 3 and 6 permits insertion and locking of the shackle in the coupling by simply forcing the member to be coupled into the hook portion. As is apparent, the entire load acting upon the coupling is supported by the body member and no pressure or pull is exerted upon the locking slide.

In order to release the shackle from the coupling, lever 29 is pivoted from the first pivotal position of FIGS. 3 and 6 into a second pivotal position, shown in FIG. 7 in full line. In this position, pin 35 on lever 29 abuts against or is close to shoulder 43 on slide 28 when the slide is in its locking position. Accordingly, pin 35 will force the slide downwardly against the action of spring 40 when and while lever 29 is being pivoted towards the second position of FIG. 7, thus causing the slide to be retracted clear of guideway 25b. Shackle 27 is now free to be lifted out of the hook portion.

The coupling further provides an ejection assembly for ejecting the shackle from the coupling. To eject the shackle, lever 29 is moved from the second pivot position of FIG. 7 (shown in full lines) into a third pivotal position shown in dotted lines in FIG. 7. The lateral extension 31 of slot or recess 30 permits movement of lever 29 through its pivotal positions by moving into and out of extension slot 31. The positions occupied by pin 35 are shown in FIGS. 6 and 7 in full, dashed and dotted lines respectively. As the lever approaches its third position, a nose 49 on the lever penetrates into the space defined by the hook portion and forces the shackle therein past nose 50 from the shaded left hand position into the right hand position, as it is clearly shown in FIG. 7. The coupling will now drop free of the shackle. The aforedescribed configuration of the space 44 within which lever 29 is turnable permits such continued movement of the lever. The lever is then returned into the position of FIGS. 1 or 3 in which the coupling is ready to receive a shackle for coupling and locking.

Figure 1:
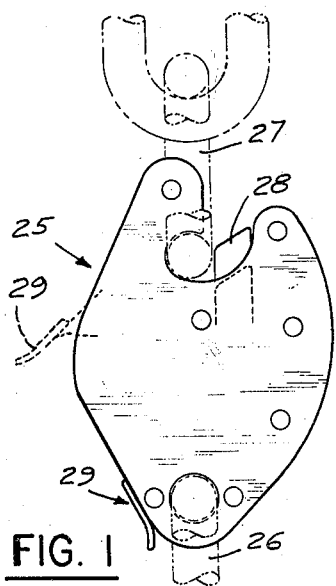
FIG. 1 is a front elevation of a coupling according to the invention.
Figure 2:
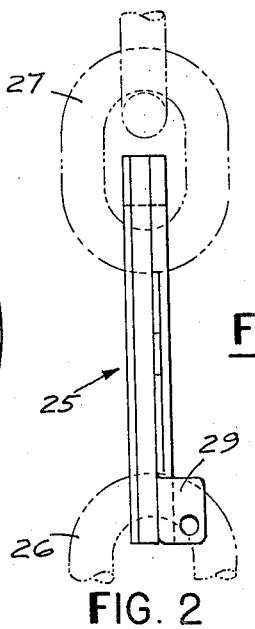
FIG. 2 is a side elevation of FIG. 1.
Figure 5:
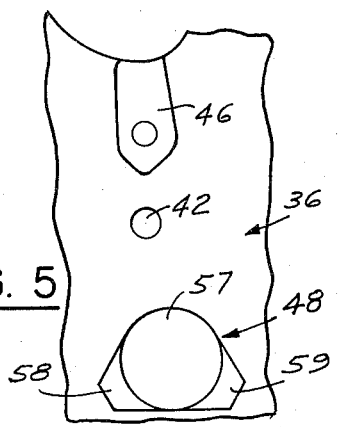
FIG. 5 is a fragmentary side view of FIG. 4 taken on line 5—5 of FIG. 4.

The locking assembly 41 comprises an actuating button 51 held in hole 48 of plate 36 by a spring 52. Button 51 has a radial projection 53 and on its face a peripheral recess 54, the outline of which is clearly shown in FIGS. 8 and 10, a screwdriver slot 55 and an indicating arrow 56. Hole 48 in which the button is received is formed with a circular hole portion 57 and two radial extending recessed portions 58 and 59. Portions 58 and 59 are of unequal depth, recessed portion 58 being the deeper one. Button 51, which is turnable in hole 57, may be placed either in a position in which extension 53 engages recessed portion 58 (see FIG. 9) or in a position in which the extension engages recessed portion 59 (see FIG. 11). When button 51 is in the position of FIG. 8, the body of the button projects into and substantially fills a curved portion 60 formed in lever 29, thereby preventing pivoting of the lever from its first pivot position, as shown in FIGS. 1 and 3 or FIG. 6, into the second or third pivot position as shown in FIG. 7.

Accordingly, lock assembly 41 constitutes a safety device preventing accidental tripping of the coupling.

FIGS. 8 and 10 are labeled SAFETY and ON or OFF.

In FIG. 8 the lock assembly is in the safety ON position, as it is indicated by an arrow 56 pointing to the legend ON.

To free the coupling for tripping, it is only necessary to depress button 51 against the action of spring 52 to an extent such that the sector 61 of lever 29 can pass recess 54 formed in button 51.

In the event the precaution of locking the coupling against accidental tripping is not believed to be necessary, or it is intended to trip the coupling by remote control, for instance, by means of a lanyard connected to an eye or hole 62 in lever 29, the button is depressed and turned by a screwdriver-shaped tool into the position of FIG. 10. Recess 59 formed in plate 36 is so shallow that recess 54 formed in button 51 permits passage of sector 61 of lever 29 when the lever is pivoted from its locked position into either one of its two release positions indicated in FIG. 7. As it is shown in FIG. 10, arrow 56 points to the legend SAFETY OFF when the button is placed in a position permitting tripping of the coupling without preceding release by depressing the button of the lock assembly.

While the invention has been described in detail with respect to a certain now preferred example and embodiment of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A coupling comprising a body member formed with a hook portion, a guideway leading into the mouth of said hook portion for guiding a member to be coupled into and out of a position retained by said hook portion and a slideway issuing into said guideway; a slide slidable in said slideway between a locking position locking said guideway and a release position clearing said guideway; spring means biasing said slide into its locking position; a tripping means for moving the slide into its release position, said tripping means including an actuating lever pivotally mounted on said body member and transmission means between said lever and said slide so as to translate a pivotal lever movement into a linear slide movement, said transmission means freeing said slide in a first pivotal position for movement of the slide into its locking position by the action of said spring means and withdrawing the slide into its release position upon pivoting the lever into a second pivotal position; and an ejecting means movable into and out of a position protruding into the hook portion and joined to said actuating lever for movement of the ejecting means into said ejecting position upon continued pivoting of the actuating lever into a third position whereby a coupled member received in the hook portion is ejected therefrom.

2. A coupling according to claim 1 wherein said body member includes a second guideway issuing in the mouth of said hook portion, said actuating lever being pivotally mounted in said second guideway and having a nose portion protruding into said mouth in said third pivotal position in the actuating lever, said second guideway and said nose portion being comprised in said ejecting means.

3. A coupling according to claim 1 wherein said actuating lever is a two-arm lever and said transmission means comprises a pin protruding from one arm of said lever and a lengthwise slot in said slide engaged by said pin and terminating in a shoulder at its end, the other arm of the lever protruding from the body member to effect pivoting of the lever from the outside of the body member whereby upon pivoting of the lever from its first position towards its second position, said pin moves along said slot and engages said shoulder to withdraw the slide into its release position against the action of said spring means and return of the lever into its first pivotal position frees the slide for return into its locking position by the action of said spring means, said slot having a transverse extension at its end terminating in said shoulder to accommodate said pin upon movement of said lever into its third pivotal position.

4. A coupling comprising a body member formed with a hook portion, a guideway leading into the mouth of said hook portion for guiding a member to be coupled into and out of a position retained by said hook portion and a slideway issuing into said guideway; a slide slidable in said slideway between a locking position locking said guideway and a release position clearing said guideway; spring means biasing said slide into its locking position; a tripping means for moving the slide into its release position, said tripping means including an actuating lever pivotally mounted on said body member and transmission means between said lever and said slide so as to translate a pivotal lever movement into a linear slide movement, said transmission means freeing said slide in a first pivotal position for movement of the slide into its locking position by the action of said spring means and withdrawing the slide into its release position upon pivoting the lever into a second pivotal position; and a locking means mounted in said body member and coacting with said actuating lever, said locking means being movable between a locking position engaging said lever to lock the same in its first pivotal position and a release position disengaged from said lever to free the same for pivoting towards its second pivotal position.

5. A coupling according to claim 4 wherein said locking means comprises a locking member mounted in said body member turnable into either one of two predetermined, angular positions, said locking member permitting passage of the actuating lever past the locking member when the locking member is in one of its said angular positions to permit pivoting of the lever out of its first pivotal position into its second pivotal position blocking the actuating lever in its first pivotal position when the locking member is in the other one of said angular positions.

6. A coupling according to claim 5 wherein said locking member is mounted in an opening in a side wall of said body member and depressible in reference to said side wall, and spring means for retaining the locking member in either one of its said angular positions, depression of the locking member when in said other angular position against the action of the spring means for said locking member moving the same into a position in which said locking member frees the actuating lever for pivotal movement.

7. A coupling comprising a body member formed with a hook portion, a guideway leading into the mouth of said hook portion for guiding a member to be coupled into and out of a position retained by said hook portion and a slideway issuing into said guideway; a slide slidable in said slideway between a locking position locking said guideway and a release position clearing said guideway; spring means biasing said slide into its locking position; and a tripping means for moving the slide into its release position; said tripping means including an actuating lever pivotally mounted on said body member and transmission means between said lever and said slide so as to translate a pivotal lever movement into a linear slide movement, said transmission means freeing said slide in a first pivotal position for movement of the slide into its locking position by the action of said spring means and withdrawing the slide into its release position upon pivoting the lever into a second pivotal position, said actuating lever being a two-arm lever and said transmission means comprising a pin protruding from one arm of said lever and a lengthwise slot in said slide engaged by said pin annd terminating in a shoulder at its end, the other arm of the lever protruding from the body member to effect pivoting of the lever from the outside of the body member whereby upon pivoting of the lever from its first position towards its second position, said pin moves along said slot and engages said shoulder to withdraw the slide into its release position against the action of said spring means and return of the lever into its first pivotal position frees the slide for return into the locking position by the action of said spring means.

8. A coupling comprising a body member formed with a hook portion, a guideway leading into the mouth of said hook portion for guiding a member to be coupled into and out of a position retained by said hook portion and a slideway issuing into said guideway; a slide slideable in said slideway between a locking position locking said guideway and a release position clearing said guideway; spring means biasing said slide into its locking position; a tripping means for moving the slide into its release position, said tripping means including an actuating means pivotally mounted on said body member and transmission means between said lever and said slide so as to translate a pivotal movement of the actuating means into a linear slide movement, said transmission means freeing said slide in a first pivotal position for movement of the slide into its locking position by the action of said spring means and withdrawing the slide into its release position upon pivoting the actuating means into a second pivotal position, an ejecting means movable into and out of a position protruding into the mouth of the hook portion and joined to said actuating means for movement of the ejecting means into said ejecting position upon continued pivoting of the actuating means into a third pivotal position whereby a coupled member received in the hook portion is ejected therefrom; and a locking means mounted in said body member and coacting with said actuating means, said locking means being movable between a locking position engaging said actuating means to lock the same in its first pivotal position and a release position disengaged from said actuating means to free the same for pivoting towards its second and third pivotal positions.

References Cited by the Examiner

UNITED STATES PATENTS

| 1,392,260 | 9/21 | Schollar | 24—241 |
| 1,669,418 | 5/28 | Lemex | 24—241 |
| 1,679,902 | 8/28 | Helmig | 24—241 |
| 2,419,947 | 5/47 | Foreman | 24—239 |
| 2,577,790 | 12/51 | McCormick | 24—241 |
| 2,863,201 | 12/58 | Cranen et al. | 24—241 |
| 2,870,509 | 1/59 | Gaylord | 24—75 X |
| 3,091,010 | 5/63 | Davis | 24—230.1 |
| 3,104,439 | 9/63 | Martin | 24—230.1 |

DONLEY J. STOCKING, *Primary Examiner.*